W. A. & J. F. SUDDITH.
Cotton-Planter

No. 28,913.

Patented June 26, 1860.

Witnesses.
John Burns
Thos Davis

Inventors.
W. A. Suddith
John F. Suddith

UNITED STATES PATENT OFFICE.

WM. A. SUDDITH AND JNO. F. SUDDITH, OF CHARLESTOWN, VIRGINIA.

IMPROVEMENT IN COTTON-SEED PLANTERS.

Specification forming part of Letters Patent No. 28,913, dated June 26, 1860.

*To all whom it may concern:*

Be it known that we, WM. A. SUDDITH and JNO. F. SUDDITH, of Charlestown, in the county of Jefferson, in the State of Virginia, have invented a new and useful Improvement on the Cotton-Planter; and we do hereby declare that the following is a full, clear, and exact description of the construction and operation of the same, reference being had to the annexed drawings, making a part of this specification, in which—

Figure 1:
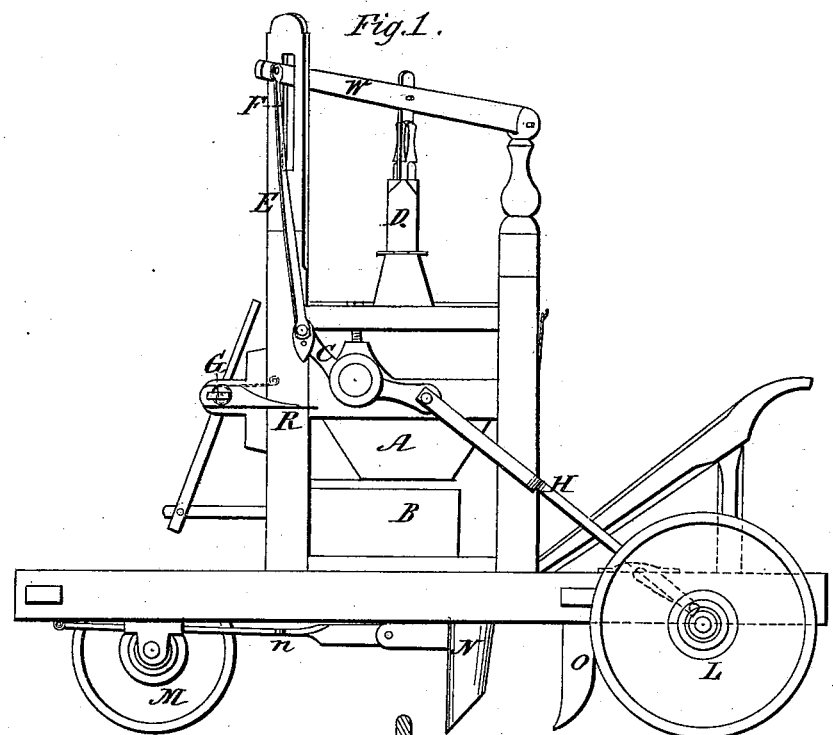
Figure 2:
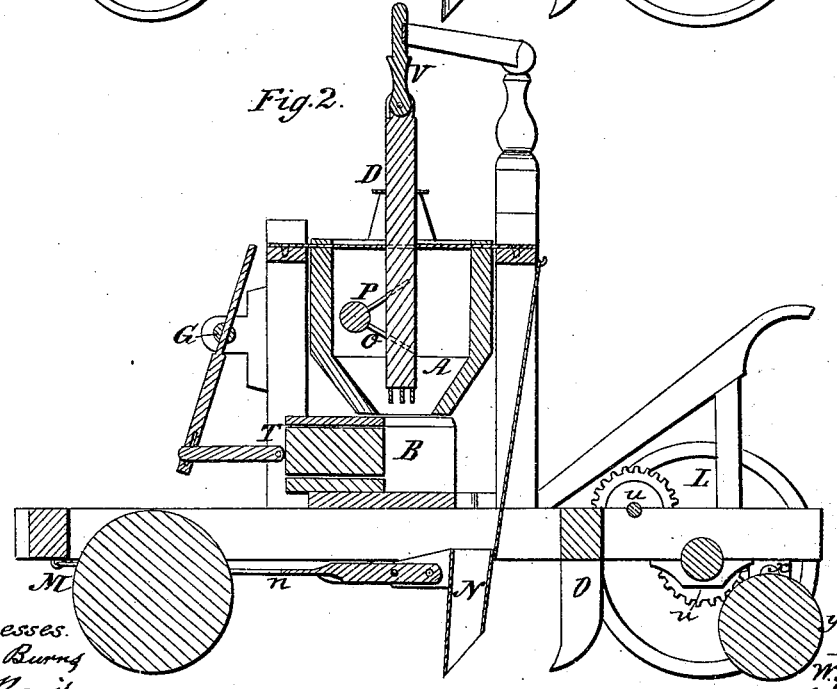

Figure 1 is a side elevation, and Fig. 2 a longitudinal vertical section.

The nature of our invention consists in laying off the ground in rows and planting the seed in hills, then covering the seed up, and rolling the ground.

Letter A is a hopper for the seed. D is a perpendicular piston, which forces the seed into cavity B, from which the seed is forced into the tooth N by spring R and piston T by means of C, a rocking beam on the end of a shaft passing through hopper A. E is a connecting-rod. F is a groove, in which arm W works. G is a shaft with spiral spring. H is a connecting-rod; L, the two large wheels; u, two small cog-wheels. M is a wheel in front of hopper. N n are the tooth and drag-bar; O, the covering; P, the handles; o, the two arms; p, the spikes; v, a joint in piston D; y, a roller; x, the arms.

We claim—

The arrangement of the rocking beam C, arm o, pistons D and T, spring R, shaft G, with spiral spring, and cavity B, constructed and operated as described, for the purpose specified.

WM. A. SUDDITH.
    JOHN F. SUDDITH.

Witnesses:
 EDWARD AISQUITH, Jr.,
 J. RAUM.